Sept. 15, 1925.

M. KENNEDY, JR 1,553,382

CURRENT COLLECTOR

Filed Oct. 20, 1921

WITNESSES:

INVENTOR
*Maxwell Kennedy Jr.*
BY

ATTORNEY

Patented Sept. 15, 1925.

1,553,382

UNITED STATES PATENT OFFICE.

MAXWELL KENNEDY, JR., OF FOREST HILLS, PENNSYLVANIA, ASSIGNOR TO WESTINGHOUSE ELECTRIC & MANUFACTURING COMPANY, A CORPORATION OF PENNSYLVANIA.

CURRENT COLLECTOR.

Application filed October 20, 1921. Serial No. 509,057.

*To all whom it may concern:*

Be it known that I, MAXWELL KENNEDY, Jr., a citizen of the United States, and a resident of Forest Hills, in the county of Allegheny and State of Pennsylvania, have invented a new and useful Improvement in Current Collectors, of which the following is a specification.

My invention relates to trolley poles and particularly to means for supporting current collectors thereon.

One of the objects of my invention is the provision of means for conveniently moving a pair of current collectors into engagement with two trolley wires.

Another object of my invention is the provision of means for maintaining a pair of current collectors in operative relation to a pair of trolley wires, regardless of slight deviations from parallelism by said wires.

Still another object of my invention is the provision of means whereby a trolley wheel or other current collector may readily adjust itself to deviations in the alinement of a trolley wire, regardless of the inertia of the pole by which the current collector is supported.

Another object is the provision of improved means for conducting current from the current collectors to the trolley pole.

Figure 1:
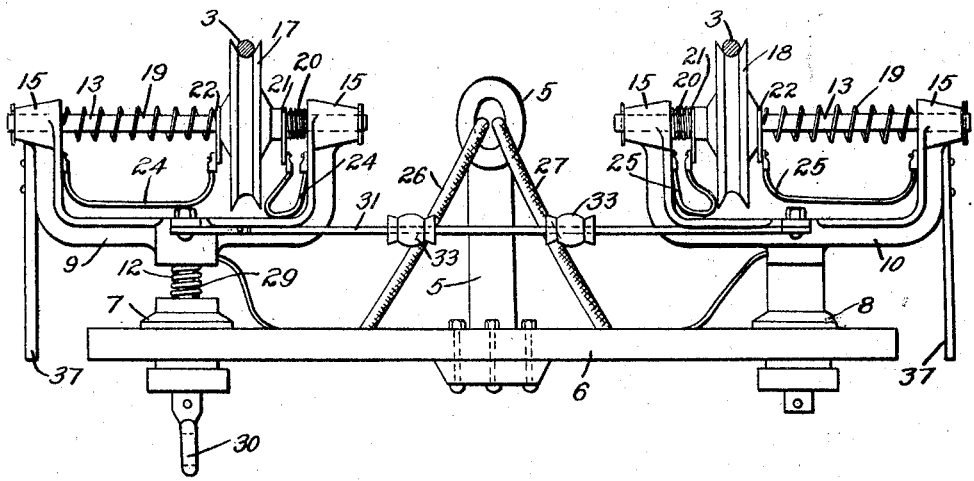
Figure 2:
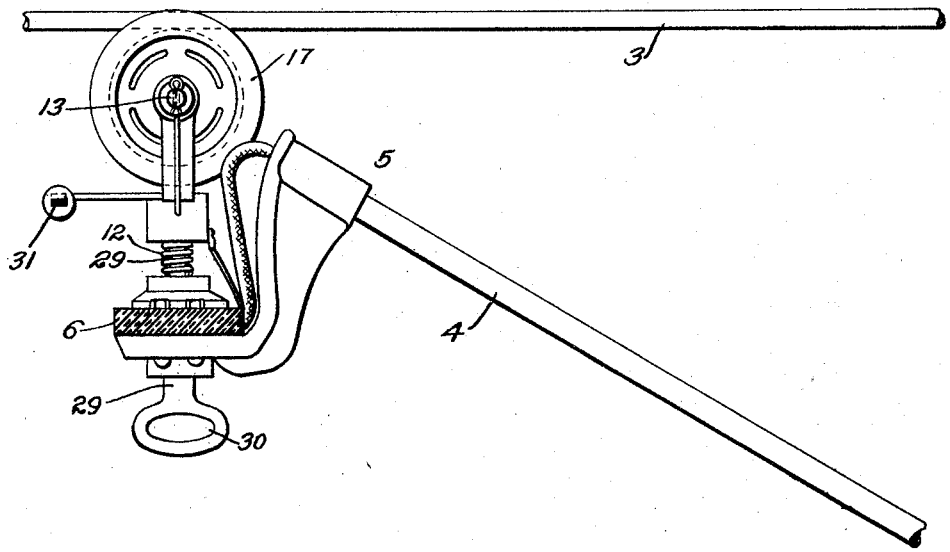

The foregoing objects I attain by means of the construction illustrated in the accompanying drawing wherein:

Figure 1 is a view, in rear elevation, of a pole head having my invention applied thereto, and Fig. 2 is a view thereof, in side elevation, showing a portion of the trolley pole.

The device is shown as used in connection with a pair of trolley wires 3 such as are employed in connection with railless electric cars. A trolley pole 4 is supported upon the roof of a trolley car, (not shown) and may be mounted upon a swivel base and biased upwardly by springs, in the usual manner.

The pole 4 is provided with a head or bracket 5 at its upper end, and a bar 6, of insulating material, is secured to the pole head 5. The bar 6 is provided, at its opposite ends, with bearing members 7 and 8 upon which harps 9 and 10, respectively, are supported for rotative movement. A compression spring 12 is provided between the bearing 7 and the harp 9, to maintain the harp in spaced relation to the bearing.

The harps 9 and 10 are each provided with a shaft 13 supported in bearings 15. Trolley wheels 17 and 18 are rotatably supported upon the respective shafts 13 and are normally biased toward one another by springs 19. The wheels 17 and 18, at their other sides, are yieldingly engaged by springs 20 and washers 21 that serve as current-conducting members. Washers 22 are yieldingly held, by the springs 19, against the other sides of the wheels 17 and 18, respectively, and also serve as conducting members. The springs maintain firm engagement of the conducting members 21 and 22 with the trolley wheels, and current is conducted, through the flexible conductors 24 and 25 to conductors 26 and 27, respectively, and thence to the electrical apparatus within the car. The washers 21 and 22 may be non-rotatably mounted on the shafts 13, by means of a key-and-slot arrangement, or otherwise.

A rod 29 is secured to the trolley harp 9 and extends downwardly through the bearing 7. The rod 29 has slidable engagement with the bearing 7 and is provided, at its lower end, with an eye portion 30 into which a hook may be inserted to maniuplate the current collectors, as will be hereinafter described.

A cross bar 31, which is pivotally connected to the harps 9 and 10, contains insulating members 33 that prevent leakage of current thereacross.

The bar 31 serves to maintain trolley wheels 17 and 18 in parallelism, owing to the fact that, when one of the harps is turned upon its pivot, the other harp will be thereby correspondingly moved.

The spring 12 is of such strength that, under normal conditions, it will be partially compressed when the pole is biased to effect operative engagement of the collectors 17 and 18 with the wires 3. Therefore, if, at any place in the line, one of the wires 3 lies in a slightly lower plane than the other, the wheel 17 will be further depressed, by reason of the resultant increased pressure thereupon, or be advanced by reason of a reduction in pressure thereupon, depending upon which wire occupies the lower plane. The spring 12 thus serves to maintain the wheels in parallelism with the substantially horizontal plane of the trolley wires and to insure an uninterrupted flow of current.

The springs 19 normally maintain the trolley wheels 17 and 18 in predetermined spaced relation, but, whenever the trolley bus turns to one side of its normal path, the trolley pole is moved to a position diagonally of the trolley wires 3, and the distance from the point at which the wheel 17 engages its wire 3 and the point at which the wheel 18 engages the other wire is greater than the distance between such points when the pole is in substantial parallelism with the wires.

When this condition arises, either the wheel 17 or the wheel 18 is cammed, by reason of its engagement with the wire, against its spring 19, thereby permitting the wheels to be automatically adjusted to variations in distances between their respective points of engagement between the wires 3. In order to place the wheels 17 and 18 in engagement with the trolley wires, a hook may be inserted into the eye 30, and the harp 9 be depressed to clear its wire 3. The pole may then be moved to bring the wheel 18 directly under the other wire and the rod 29 rotated, by means of the eye 30, to move the harps about their pivots until the wheels are in parallelism with the trolley wires. The rod 29 may then be released to permit the wheels to move into engagement with the trolley wires.

Guard members 37 are provided to prevent the wires from becoming entangled with the under side of the harps when the trolley wheels leave the wires.

While I have shown my invention as embodying trolley wheels, it is obvious that shoes may be substituted therefor, if desired, and, furthermore, the invention is not necessarily limited to a double collector device but various features thereof are equally applicable to a single collecting member.

Various other modifications may be made without avoiding the spirit and scope of the invention as defined in the accompanying claims.

I claim as my invention:

1. The combination with a trolley pole, of a pair of current collectors pivotally supported thereby for rotative movement in a horizontal plane, and means for maintaining the collectors in parallelism.

2. The combination with a trolley pole, of a cross bar supported thereby in a horizontal plane, and a current collector pivotally supported on and adjacent to each end of the cross bar and movable longitudinally thereof.

3. The combination with a trolley pole, of a cross bar supported thereby in a horizontal plane, and a current collector pivotally supported adjacent to each end of the cross bar, both of the collectors being movable longitudinally and one of them being movable vertically with respect to the bar.

4. The combination with a trolley pole, of a pair of current collectors pivotally supported thereby for rotative movement in a horizontal plane, and means for transmitting rotative movement from the one to the other of the said collectors.

5. The combination with a trolley pole, of a pair of current collectors pivotally supported thereby for rotative movement in a horizontal plane, and means for transmitting rotative movement from the one to the other of the said collectors, one of the collectors being yieldingly supported for independent movement in a vertical plane.

6. The combination with a trolley pole, of two current collectors, one of which is movable transversely of the pole and the other of which is movable in a substantially vertical direction.

In testimony whereof, I have hereunto subscribed my name this 17th day of October 1921.

MAXWELL KENNEDY, Jr.